Nov. 30, 1937.   E. E. HARPER   2,100,316
WEIGHT CONTROLLED FEEDING MEANS
Filed May 9, 1935
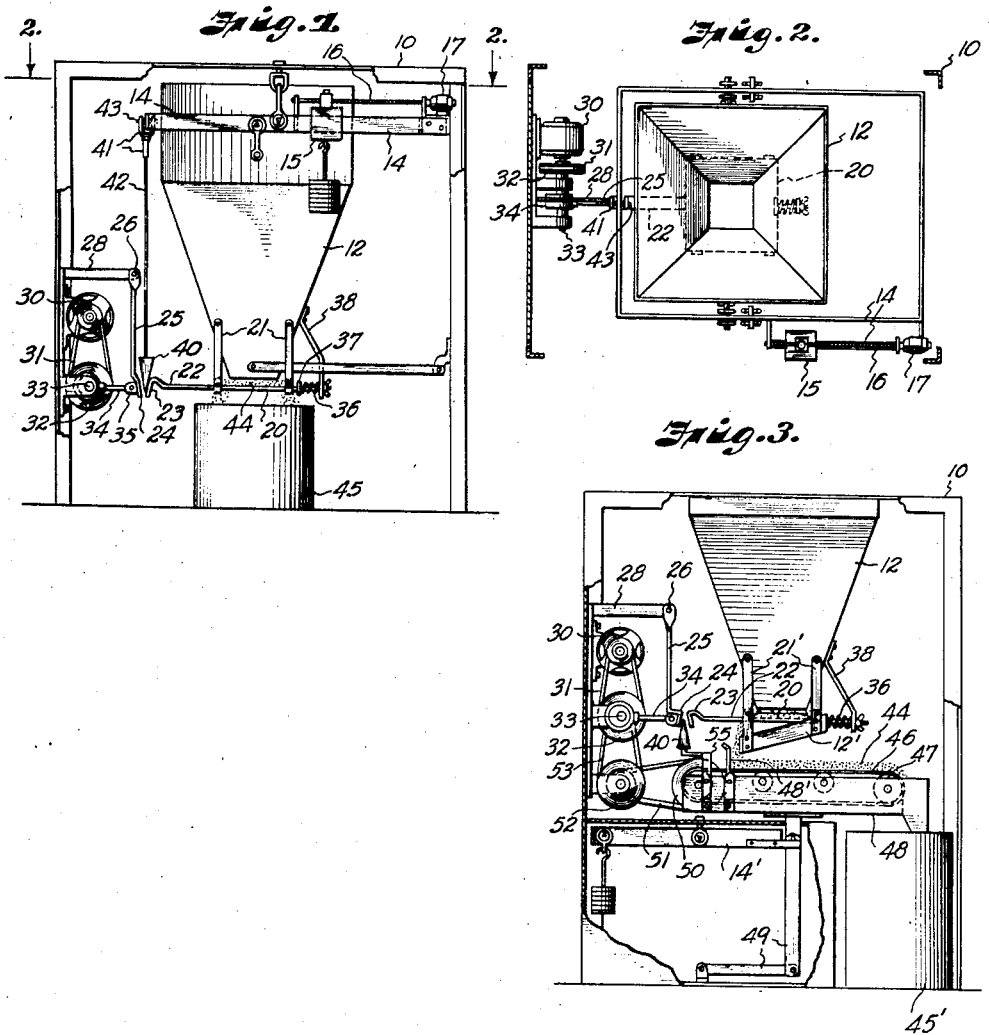
INVENTOR
E.E. Harper,
BY
ATTORNEY Patented Nov. 30, 1937

2,100,316

UNITED STATES PATENT OFFICE 2,100,316

WEIGHT CONTROLLED FEEDING MEANS

Elmer E. Harper, Kansas City, Mo.

Application May 9, 1935, Serial No. 20,599

9 Claims. (Cl. 221—118)

The present invention relates to control mechanism of a character adapted to provide means of an accurately and positively acting nature for controlling mechanical operations and in which the method of control consists in maintaining substantially uniform or constant certain set or selected operating conditions under which it is desired to have such operations take place; as, for example, where a balanced structure (such as a scale balance) is used as a medium for control and the regulation or control of the mechanical operation is accomplished by control connections responsive to fluctuations of such balanced structure for effecting whatever correction is necessary in said mechanical operation to maintain the balance of said control structure. One such mechanical operation is that which is involved in certain forms of apparatus for the feeding of materials, in which class of cases it is the object of the present invention to provide mechanism for carrying out a uniform feeding operation and to include therein a control feature which is responsive to fluctuations in scales or other mechanism for effecting such corrections in the feeding operation as are necessary for maintaining a substantially constant feeding operation.

A most important feature of the invention is the provision of a control mechanism of the character stated for that class of cases where the variations or fluctuations in the set or selected operating conditions are registered by means affording no appreciable amount of energy available for use as an effective means for carrying out any control or regulating function. Typical of such cases are those forms of apparatus employing scales or balances, where the energy involved in the movement of the scale beam, is relatively small in itself and in no event great enough to be utilized to any appreciable extent without objectionable interference with the proper function and required accuracy of such scales.

For carrying out the purposes of the present invention I employ a control mechanism which may serve as a part of the mechanism through which the normal operation of the apparatus is accomplished and which also responds to variations or fluctuations in the set or selected operating conditions (such as the balanced condition of a scales) in such a manner as to effect proper corrections for such variations, and without in any way disturbing the sensitiveness or delicate action of the scales or other mechanism which may be employed for the purposes of control.

The improved control or regulating mechanism is susceptible of a wide range of application and use, the primary characteristic of the same being a means serving as an effective control of a mechanical operation in response to variations or fluctuations of the set operating or control conditions under which that mechanical operation is to take place; that is, the extent of the adjusting movement of the essential control element of the control mechanism is a function of such fluctuations, the control element being automatically actuated thereby in such a way as to form a variable operating element for effecting both the normal mechanical operation and also such regulation thereof as may be necessary for making the required corrections in said operation to keep it uniform.

Typical examples are herein set forth for showing the special adaptation of the control mechanism to mechanical material-feeding operations, although other adaptations of the invention are equally feasible, with correspondingly satisfactory results as regards the accurate operation of the control mechanism.

With the foregoing general objects in view, therefore, the invention will now be described by reference to the accompanying drawing showing special applications of the invention as illustrative of its commercial use, after which the novel and patentable features of the invention will be particularly set forth and claimed.

In the drawing—

Figure 1 is an elevation showing a form of material-feeding apparatus having the improved control mechanism applied thereto (portions of the framework and other parts of the construction being broken away for clearness of illustration);

Figure 2 is a plan view of said apparatus, representing a section on line 2—2 of Figure 1; and Figure 3 is an elevation showing another form of feeding apparatus with the improved control mechanism incorporated therein.

In Figures 1 to 3 the invention is illustrated as applied to material-feeding apparatus used to feed a continuous weighed supply of dry material, as required in certain commercial operations, as for example in water-treatment systems. The types of apparatus illustrated in these views use scales mechanism as a part of the construction, the principle of the feeding operation being to maintain a balanced condition, either of the supply hopper and its contents in Figures 1 and 2, or of a part of the delivery mechanism and material thereon separately from the hopper and its feeding mechanism as shown in Figure 3.

Referring now more particularly to Figures 1 and 2, these show apparatus comprising a framework 10 for a hopper construction 12 which is suspended on scales mechanism including a scale beam 14 the long arm of which carries a poise 15 which is caused to travel in the direction of the beam pivot by a suitable traversing screw 16 driven by means of a synchronous motor 17 for producing a constant decrease in the balancing effect of the poise, corresponding to the decrease in the counterbalancing effect of the material left in the hopper as material is withdrawn therefrom at the rate according to which it is desired to carry on the feeding operation. The feeding mechanism at the lower end or mouth of the hopper 12 in this instance comprises a reciprocating plate or tray 20 supported by pivotal hangers 21 and provided with a projecting arm 22 having a terminal portion 23 in proximity to the terminal portion 24 of an actuating arm 25 suspended for free swinging movement from a fulcrum point 26 at the end of an overhead framepiece 28. The reciprocating action necessary for the feeding movement of the tray 20 is produced by means of a motor 30 and belt 31 operating a pulley 32 on a shaft 33 for driving an eccentric member 34, one end of which is pivoted to lugs 35 provided on the terminal 24, whereby the latter is constantly reciprocated for producing the required feeding action. The thrust imparted to the tray 20 is counteracted by a coil spring 36 interposed between a collar 37 and a bracket 38 attached to the hopper 12.

The salient control feature of the present improved control mechanism comprises an element 40 of appropriate shape, adapted to enter the gap between the terminals 23 and 24,—the shape of said control element 40 (herein illustrated as of tapered or wedge shape) being such as to span various sizes of gaps between said terminals according to the extent said control element 40 enters said gap.

The extent to which the control element 40 is allowed to enter the gap between the terminals 23 and 24 is governed by the movement of the scale beam 14, for which purpose the element 40 is suspended from the beam by means of a suspension bar or rod 42 or the like connected to said beam by a set of links 41 and pins 43. Thus the element 40 is designed to form one of the train of operating connections for reciprocating the tray 20, and the position of said control element 40 governs the length of stroke or reciprocation which is imparted to said tray and which constitutes its feeding movement.

With the described arrangement of parts, after the material 44 is put in the hopper 12, the poise 15 is manually adjusted along the beam 14 until the scales are in balance, and the control element 40 is suspended within the gap between the terminals 23 and 24 and so adjusted that its normal operation (as the medium through which the tray is reciprocated) will be to impart such reciprocating movement thereto as to feed just that amount of material from the hopper which is required to compensate for the travel of the poise 15 and keep the scales in balance, so far as the movement of the poise itself is concerned. After clutching the poise 15 with the traversing screw, the motors 17 and 30 are started, and the feeding operation proceeds by reciprocation of the tray 20 for dislodging the material thereon into the receptacle 45 or other device mounted in position to receive the material as it is discharged from the hopper. It will now be seen that if an irregularity in the rate of feed occurs, such as may arise from irregularities in the flow or movement or due to uneven density of the material itself, this will result in a slight rise or fall of the hopper and corresponding movement of the control element to the extent necessary for increasing or diminishing the feeding stroke and thus make the required correction in the feeding rate for keeping the scales in balance.

It will be seen that the function of the control mechanism is to regulate the feeding movement of the tray so that it will feed just enough material to keep the scales in balance,—this being the "set" condition under which the apparatus is to operate, and the movement of the control element is accordingly a function of the variation or fluctuation of the scale beam. The shape of the control element 40 is therefore designed to vary, according to its position in the gap between the terminals 23 and 24, the length of stroke or reciprocation which is imparted to the tray 20, so that its feeding movement is correspondingly varied.

In Figure 3 is shown an apparatus in which the hopper 12 is maintained in fixed position, while the material as discharged from the tray 20 is received by an endless conveyor belt 46 operating around rollers 47 in a framework 48 which is mounted on a scale beam 14', pivoted anchoring members 49 being employed for maintaining the horizontal position of said framework 48 and belt 46, and an inclined chute 12' being supported by the pivotal hangers 21' in position to direct the material as discharged from the tray 20 against a transverse baffle plate or blade 48', whereby the material is evenly spread across the top run of the belt 46. This conveyor belt is driven by a pulley 50 connected by a drive belt with a pulley 52, which is in turn driven by a belt 53 from the shaft 33 which actuates the eccentric member 34. In this instance, however, the control element 40 is carried by a bracket 55 on the framework 48 and thereby supported in operative position within the gap between the terminals 23 and 24 as shown. By means of this arrangement and construction, the same control function obviously is provided for as in the apparatus shown in Figures 1 and 2, for the position of the control element 40 is governed by the movement of the scale mechanism for so regulating the amount of material supplied to the conveyor that the weight of the material thereon will be constantly just that amount required to preserve the scales in proper balance.

It will be apparent, therefore, from the above applications of the improved control mechanism, that the same operate without the slightest interference with the accuracy or sensitiveness of the scales or other mechanism with which the control mechanism is associated. The control element 40 is also of a type adapted to constitute a positive drive element in the train of actuating mechanism for producing the operation which is being controlled; and between each operating impulse the control element is fully released and therefore free to move in either direction necessary for responding to the influence of the scales or other type of regulating mechanism which may be used, and without any disturbance whatever of the function of said scales or other mechanism. While the apparatus is illustrated as requiring the control element to move the same extent as the scale beam, it is obvious that any desired amplification of said element's movement may be produced by suitable forms of lever arrangements or other well-known types of amplifying means, without departing from the principle of the invention; and, moreover, the form and contour of the control element itself (irregular, straight taper or curved), or suitable cam mechanism with an equivalent function, may also be adapted to whatever special purpose or control function the operating conditions may require.

The material of which the control element 40 is constructed may preferably be of leather or rubber composition to provide for resilient contacting action as well as for substantially silent operation.

It is also apparent that the speed at which the motor-driven eccentric member 34 is operated may be varied within wide limits, for imparting either a slow or rapid reciprocating or vibrating movement to the remaining operating elements, according to the requirements of the particular case.

The advantages of the improved control mechanism over other forms, such as those using electric control means, will be at once recognized when the objections to the latter types are considered, such as the fact that an electric control connection, as usually made, operates only in an intermittent fashion, i. e., the circuit is either on or off, and therefore the control function is not continuous or gradual as is the case with the present simplified form of control element, which may be of wedge-shape or any other desired contour and therefore operates continuously or gradually for effecting an uninterrupted and graduated control action.

It will therefore be seen that I have devised a control mechanism which is susceptible of wide and varied application for the purpose of governing and regulating mechanical functions of different types, including the examples herein illustrated; and while the foregoing represents particularly useful applications of the principle of my invention I desire to reserve the right to make whatever changes or modifications may fairly be deemed to fall within the spirit and scope of the appended claims.

Having thus described the invention, what I claim as new and desire to secure by Letters-Patent is:—

1. Control mechanism comprising, in combination with material-feeding mechanism, scales apparatus including a scale beam in cooperative relation to said feeding mechanism for responding directly to variations in the feeding operation, a movable driven member forming a part of said feeding mechanism and provided with an abutment element, an actuating means provided with a reciprocating abutment element in spaced relation to said first element, and a control element responsive to fluctuations of said beam and located between said first elements for constituting a variable drive abutment between said actuating means and said movable member.

2. Control mechanism comprising, in combination with material-feeding mechanism, scales apparatus including a scale beam in cooperative relation to said feeding mechanism for responding directly to variations in the feeding operation, a movable driven member forming a part of said feeding mechanism and provided with an abutment element, an actuating means provided with a reciprocating abutment element in spaced relation to said first element, and a control element supported by the scale beam in balance with the load thereon and in abutting relation between said abutment elements for constituting a variable drive abutment between said actuating means and said movable member.

3. Control mechanism comprising, in combination with scales apparatus, material-feeding mechanism supported on said scales apparatus and provided with a driven member having an abutment element, an actuating means provided with a reciprocating abutment element in spaced relation to said first element, and a control element responsive to fluctuations of said scales apparatus and located between said abutment elements for constituting a variable drive abutment between said actuating means and said driven member.

4. Control mechanism comprising, in combination with scales apparatus, a container supported on said scales apparatus and provided with feeding mechanism for feeding material from the container and including a driven member having an abutment element, an actuating means provided with a reciprocating abutment element in spaced relation to said first element, and a control element responsive to fluctuations of said scales apparatus and located between said abutment elements for constituting a variable drive abutment between said actuating means and said driven member.

5. A weighing feeder construction comprising, in combination with scales mechanism, material-feeding mechanism, an actuating means, and control means including a graduated control member mounted for movement independently of said feeding mechanism and actuating means and actuated in response to fluctuations of said scales mechanism for constituting said member as a variable drive element between said actuating means and said material-feeding mechanism, said control member being mounted in operative drive relation to both said feeding mechanism and actuating means while free to move between successive drive impulses for allowing said control member entirely idle and independent adjusting movement in response to fluctuations of said scales mechanism.

6. A weighing feeder construction comprising, in combination with scales mechanism including a scale beam, material-feeding mechanism designed to have its action controlled in accordance with fluctuations of said beam, an actuating means, and a control element mounted for movement independently of said feeding mechanism and actuating means and actuated in response to fluctuations of said beam for functioning as a positive and variable drive connection between said actuating means and said material-feeding mechanism, said control element being mounted in operative drive relation to both said feeding mechanism and actuating means while free to move between successive drive impulses for allowing said control element entirely idle and independent adjusting movement in response to fluctuating movements of said beam.

7. A weighing feeder construction comprising, in combination with scales mechanism including a scale beam, material-feeding mechanism designed to have its action controlled in accordance with fluctuations of said beam, an actuating means, and a control element mounted for movement independently of said feeding mechanism and actuating means and directly actuated by said beam in response to fluctuations thereof for making intermittent engagement with said actuating means and feeding mechanism and thereby functioning as a positive and variable drive connection between said actuating means and material-feeding mechanism, said control element being mounted in operative drive relation to both said feeding mechanism and actuating means while free to move between successive drive impulses for allowing said control element entirely idle and independent adjusting movement in response to fluctuating movements of said beam.

8. A weighing feeder construction comprising, in combination with scales mechanism, material-feeding mechanism designed to have its action controlled in accordance with fluctuations of said scales mechanism, an actuating means, and a control element supported by the structure of said scales mechanism for imposing no load thereon in responding to fluctuations of the scales mechanism for making intermittent engagement with said actuating means and feeding mechanism and thereby acting as a variable drive element between said actuating means and said feeding mechanism, said control element being mounted in operative drive relation to both said feeding mechanism and actuating means while free to move between successive driving impulses for allowing said control element entirely idle and independent adjusting movement in response to fluctuations of said scales mechanism.

9. A weighing feeder construction comprising, in combination with scales mechanism, material-feeding mechanism designed to have its action controlled in accordance with fluctuations of said scales mechanism, an actuating means, and a control element having a contour adapted to effect a graduated control between said actuating means and said material-feeding mechanism, said control element being mounted for movement into and out of engagement with said actuating means and feeding mechanism while free to move between successive driving impulses for allowing said element entirely idle and independent adjusting movement in response to fluctuating movements of said scales mechanism.

ELMER E. HARPER.